US011361166B2

(12) United States Patent
Lin et al.

(10) Patent No.: US 11,361,166 B2
(45) Date of Patent: Jun. 14, 2022

(54) CHARACTERIZED CHATBOT WITH PERSONALITY

(71) Applicant: Microsoft Technology Licensing, LLC, Redmond, WA (US)

(72) Inventors: Pingping Lin, Redmond, WA (US); Ruihua Song, Beijing (CN); Min Zeng, Redmond, WA (US); Yan Chen, Redmond, WA (US); Yue Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/765,368

(22) PCT Filed: Dec. 13, 2018

(86) PCT No.: PCT/US2018/065316
§ 371 (c)(1),
(2) Date: May 19, 2020

(87) PCT Pub. No.: WO2019/133267
PCT Pub. Date: Jul. 4, 2019

(65) Prior Publication Data
US 2020/0342179 A1 Oct. 29, 2020

(30) Foreign Application Priority Data
Dec. 29, 2017 (CN) .......................... 201711487229.2

(51) Int. Cl.
*G06F 40/35* (2020.01)
*G06F 16/332* (2019.01)
*G06F 16/33* (2019.01)

(52) U.S. Cl.
CPC .......... *G06F 40/35* (2020.01); *G06F 16/3329* (2019.01); *G06F 16/3344* (2019.01)

(58) Field of Classification Search
None
See application file for complete search history.

(56) References Cited

U.S. PATENT DOCUMENTS

2008/0046394 A1   2/2008  Zhou et al.
2011/0078105 A1*  3/2011  Wallace ................ G06Q 30/02
                                                706/47
(Continued)

FOREIGN PATENT DOCUMENTS

CN    104290097 A    1/2015
CN    105425953 A    3/2016
(Continued)

OTHER PUBLICATIONS

Boni, et al., "Humour, Relationship Maintenance and Personality Matching in Automated Dialogue: A Controlled Study", In Interacting with Computers vol. 20, Issue 3, May 2008, pp. 342-353.
(Continued)

*Primary Examiner* — Antim G Shah
(74) *Attorney, Agent, or Firm* — Schwegman Lundberg Woessner, P.A.

(57) ABSTRACT

The present disclosure provides a technical solution related to establishing a characterized chatbot with personality. On one hand, a corpus database matched with a specific character may be established, and a generated regular/conventional response messages may be converted into a characterized response messages with character's features during conversation, so that the conversation style of a chatbot may be characterized with a certain character's features. On the other hand, a chatbot may select a response message with a specific emotion by using an emotion conversation table corresponding to a personality when generating the response
(Continued)

message against a content of a conversation input by a user, so that a chatbot may be characterized and have certain personality.

4 Claims, 8 Drawing Sheets

(56) References Cited

U.S. PATENT DOCUMENTS

| | | | |
|---|---|---|---|
| 2012/0296635 A1 | 11/2012 | Brockett et al. | |
| 2014/0297568 A1* | 10/2014 | Beilby (nee Capper) | G06N 5/02 706/11 |
| 2017/0134313 A1 | 5/2017 | Poupart et al. | |
| 2017/0353404 A1 | 12/2017 | Hodge | |
| 2018/0365212 A1* | 12/2018 | Banerjee | H04L 51/02 |

FOREIGN PATENT DOCUMENTS

| | | |
|---|---|---|
| CN | 106649404 A | 5/2017 |
| CN | 106874472 A | 6/2017 |
| CN | 107340991 A | 11/2017 |
| EP | 0798652 A2 | 10/1997 |
| KR | 20070008477 A | 1/2007 |

OTHER PUBLICATIONS

"International Search Report and Written Opinion Issued in PCT Application No. PCT/US18/065316", dated Jun. 18, 2020, 18 Pages.

"First Office Action and Search Report Issued in Chinese Patent Application No. 201711487229.2", (w/ English Translation), dated Oct. 11, 2021, 27 Pages.

* cited by examiner

CHARACTERIZED CHATBOT WITH PERSONALITY

CROSS-REFERENCE TO RELATED APPLICATION

This application is a U.S. National Stage Filing under 35 U.S.C. 371 of International Patent Application Serial No. PCT/US2018/065316, filed Dec. 13, 2018, and published as WO 2019/133267 on Jul. 4, 2019, which claims priority to Chinese Application No. 201711487229.2, filed Dec. 29, 2017, which applications and publication are incorporated herein by reference in their entirety.

BACKGROUND

A chatbot is an application program or a computer system for stimulating conversation or chatting between human beings. With development of language processing technique, the chatbot has been widely used in various of application programs or intelligent devices so as to provide a flexible way for communication between human beings and machines.

The chatbot in the art now mainly focuses on the content of a response made to the speech of human beings, helping people on solving their problem. As chatbots are applied more deeply, users may look forward to a chatbot with personality more like human beings, so that the users may feel more versatile personalities.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

A technical solution related to a technique for establishing a characterized chatbot with personality is proposed. On one hand, a corpus database matched with a specific character may be established, and a generated regular/conventional response messages may be converted into a characterized response messages with characterized features during conversation, so that the conversation style of a chatbot may be characterized with certain characterized features. On the other hand, a chatbot may select a response message with a specific emotion by using an emotion conversation table corresponding to a personality when generating the response message against a content of a conversation input by a user, so that a chatbot may have certain personality.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
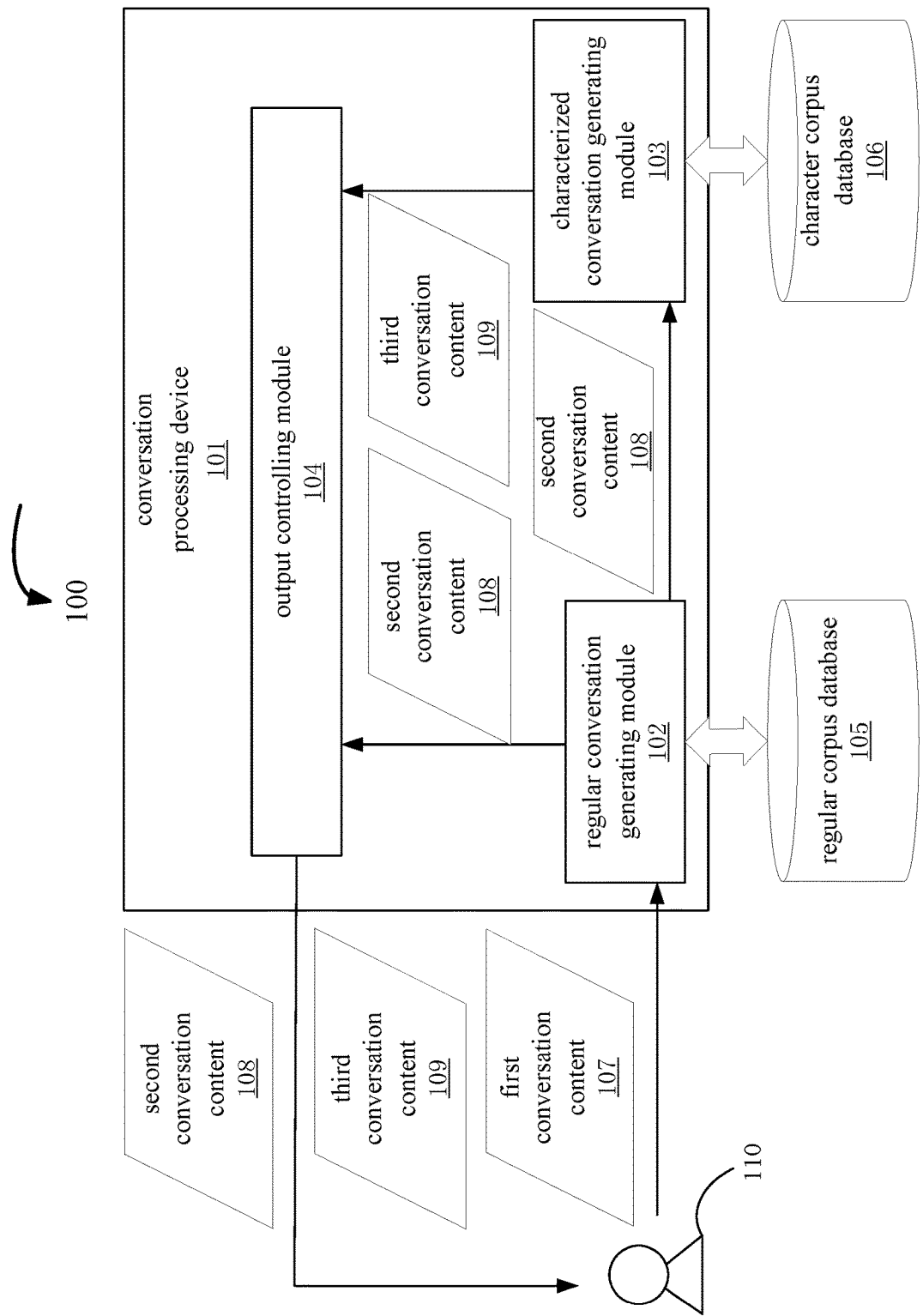
FIG. 1 is an exemplary block diagram of a conversation processing device of embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, systems, and computer program products related to creating a chatbot, which has a characterized conversation style and a personality conversation style.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

A chatbot with a characterized conversation style may establish a character corpus database matched with a specific character, and convert a generated regular response message into a characterized response message with characterized features during conversation, so that the conversation style of a chatbot may have specific characterized features.

A chatbot with a personality conversation style may express different personalities as input conversation content with some emotion during conversation so that it would be easier to make response with the conversation content of some emotion. With such mechanism, a chatbot may make a response as output by selecting some response message with specific emotion according to an emotion conversation table corresponding to a personality when generating a response message against conversation content input by a user, so as to express features of personalities in this way.

Description would be made on the specific implementations of these two kinds of chatbot in the following.

As shown in FIG. 1, which is an exemplary block diagram 100 of a conversation processing device of embodiments of the present disclosure, the conversation processing device 101 may be implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The conversation processing device 101 may be also implemented or provided in a personal computer including configurations of laptop computer and non-laptop computer. Furthermore, the conversation processing device 101 may be further implemented as a server on internet or provided in a server on internet. Such server may be implemented in one or more computer systems (distributed server), or implemented as a server based on cloud technology. Such server may be connected with a user's terminal via internet, receive voice output of the user collected by the user's terminal and generate a response message after a conversation processing so as to return the generated response message to the user's terminal as output to the user. The conversation processing device 101 of embodiments of the present disclosure may implement the functions of a chatbot as described above.

The conversation processing device 101 as shown in FIG. 1 may include: a regular conversation generating module 102, a characterized conversation generating module 103, and an output controlling module 104. The conversation processing device 101 may obtain the necessary conversation content as needed by accessing a regular corpus database 105 and a character corpus database 106.

The regular conversation generating module 102 may be configured to obtain a first conversation content 107 input by a user 110 and generate a second conversation content 108, which could be used as a response message, according to the first conversation content 107. In a conversation mode of Question-Answer (QA mode), the first conversation content 107 may correspond to a query message input by the user, and the second conversation content 108 may correspond to an answer message against the query message. In the regular corpus database 105, the query message and the response message may establish a mapping relationship therebetween. The corpus in the regular corpus database 105 may be a combination of a query message and a response message having mapping relationship therebetween. One query message may correspond to one response message or correspond to a plurality of response messages.

When obtaining the second conversation content 108 according to the first conversation content 107, a plurality of query messages similar with the first conversation content 107 may be first searched for in the regular corpus database 105 according to the first conversation content, and a plurality of corresponding response messages may be then obtained according to the plurality of query messages. Then the plurality of response messages may be stored according to a ranking algorithm. The response message ranked top may be selected as the second conversation content 108.

The characterized conversation generating module 103 may be configured to search for a third conversation content 109 matched with the second conversation content 108 in the character corpus database 106 according to the second conversation content 108.

The corpus in the character corpus database 106 may be a pair of response messages (Answer Pair) having mapping relationship therebetween. Each pair of response messages may contain a first response message extracted from the regular corpus database 105 and a second response message with characterized features generated according to the first response message. When the regular conversation generating module 102 determines a second conversation content 108, the characterized conversation generating module 103 may perform search in the corpus database 106 with the second conversation content 108 as the first response message, so as to obtain a second response message matched with the first response message as the third conversation content 109 as described above.

In embodiments of the present disclosure, the pairs of response messages in the character corpus database 106 may be unable to include all response messages in the regular corpus database 105. In view of processing efficiency, the character corpus database 106 may generate a second response message with characterized features only with respect to the first response messages frequently appear in the regular corpus database 105. Therefore, there is possibility that a matched third conversation content 109 may be not found when a search is performed according to the second conversation content 108 in the character corpus database 106.

Furthermore, to utilize the character corpus database 106 more efficiently, a similarity threshold may be further used. In the processing of searching for a third conversation content 109 matched with the second conversation content 108, one or more first response messages whose similarity with the second conversation content 108 satisfying the similarity threshold may be first searched for, and then a second response message corresponding to that first response message may be obtained as a third conversation content 109. The participation of the character corpus database 106 in the conversation may be adjusted by using that similarity threshold. More particularly, if that similarity threshold is adjusted to be high, the possibility for obtaining the third conversation content 109 may be lower, and then the output controlling module 104 may output more second conversation content 108 obtained from the regular corpus database 105. If that similarity threshold is lowered, the possibility for obtaining the third conversation content 109 may be high, and then, the output controlling module 104 may output more third conversation content 109 with characterized features, and thus the conversation with chatbot may exhibit more characterized features.

The output controlling module 104 may be configured to output a second conversation content 108 or a third conversation content 109 to a user 110 according to a conversation output controlling rule upon the third conversation content 109 is found. If a third conversation content 109 is not found in the character corpus database 106, a second conversation content 108 may be output. More particularly, the conversation output controlling rule may be a controlling on the possibility for making a characterized response and a regular response. More particularly, a second conversation content 108 or a third conversation content 109 may be selectively output according to a characterized response possibility and a regular response possibility. More particularly, the characterized response possibility and the regular response possibility may be set in advance or dynamically-adjustable. In the practical conversation processing, the second conversation content 108 and the third conversation content 109 obtained by searching may be plural. One exemplarity possibility assigning way may be as follows: the outputting possibility of all second conversation content 108 may share the characterized response possibility described above, and the outputting possibility of all third conversation content 109 may share the regular response possibility described above. With such output controlling way, the possibility of the appearing of the characterized features may be controlled well. That is to say, the depth by which the chatbot exhibits the character may be controlled well.

Another exemplarity possibility assigning way may be as follows: either the second conversation content 108 or the third conversation content 109 may have equal outputting possibility, and such way of output controlling may decrease the changing on the original outputting possibility of each conversation content, so that more validity of response message may be maintained.

Furthermore, the regular corpus database 105 and the character corpus database 106 described above may be a remote database provided on internet, or a local database connected with the conversation processing device 101, or a data storage unit embedded in the conversation processing device 101.

Figure 2:
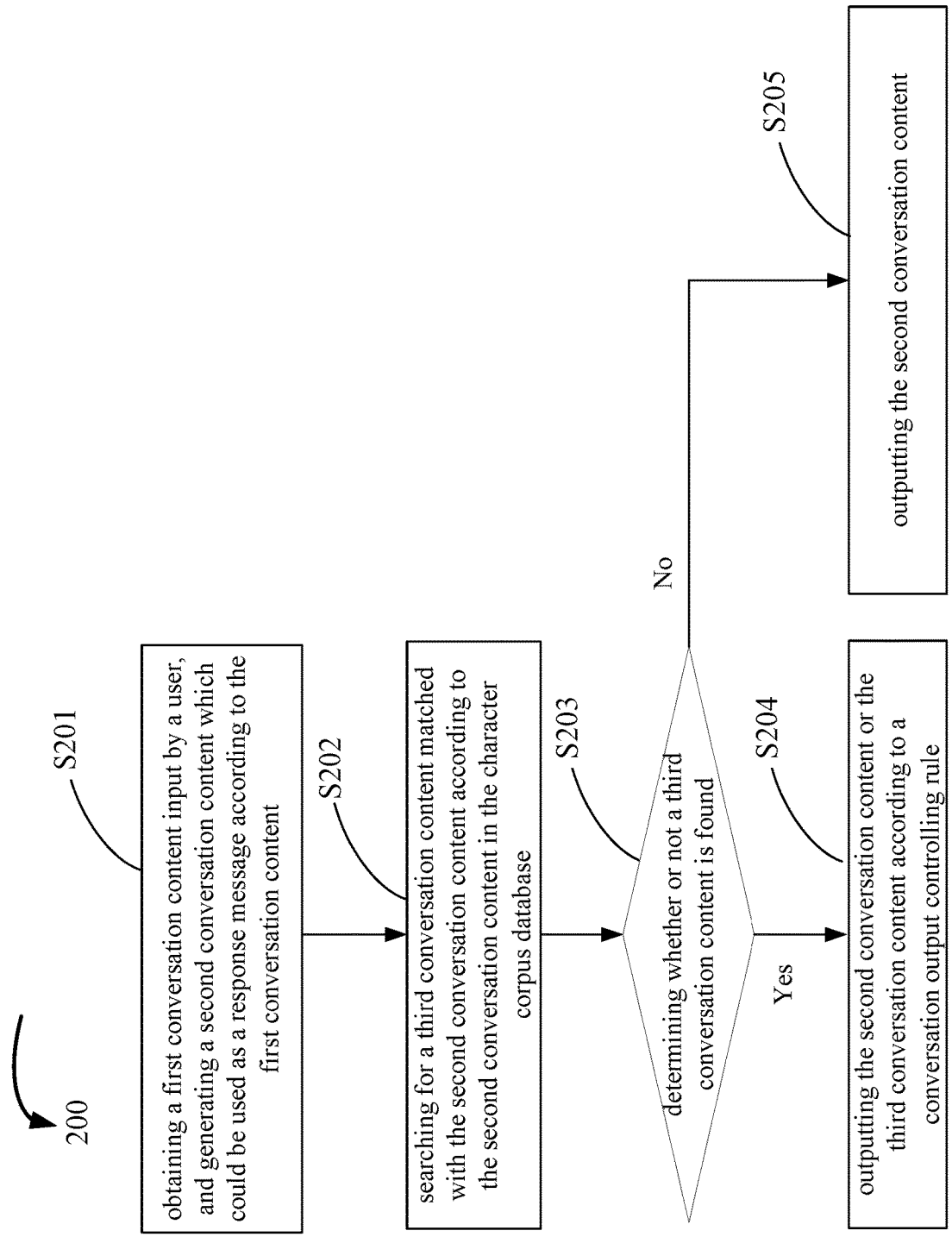
FIG. 2 is a schematic flowchart showing a conversation processing method of embodiments of the present disclosure.

As shown in FIG. 2, which is a schematic flowchart 200 showing a conversation processing method of embodiments of the present disclosure, the processing performed by the conversation processing device 101 described above may be shown as the schematic flowchart 200 and include the following steps.

S201, obtaining a first conversation content input by a user, and generating a second conversation content which could be used as a response message according to the first conversation content. This step may be performed by the regular conversation generating module 102.

S202, searching for a third conversation content matched with the second conversation content according to the second conversation content in the character corpus database. This step may be performed by the characterized conversation generating module 103. More particularly, one or more first response messages whose similarity with the second conversation content meets a similarity threshold may be searched for in the character corpus database, and then a second response message corresponding to the first response message may be obtained as a third conversation content.

S203, determining whether or not a third conversation content is found. If the third conversation content is found, the processing goes to S204, and if no third conversation content is found, the processing goes to S205. The steps of S203, S204, and S205 may be performed by the output controlling module 104.

S204, outputting the second conversation content or the third conversation content according to a conversation output controlling rule. More particularly, the outputting the second conversation content or the third conversation content according to a conversation output controlling rule may be specifically as follows: selectively outputting the second conversation content or the third conversation content according to the characterized response possibility and the regular response possibility.

S205, outputting the second conversation content.

In the embodiments of the present disclosure, in addition to the generating mode of the second conversation content, a third conversation content matched with a character may be found according to the mapping relationship of response messages by using a character corpus database, so that it may be easy and efficient to implement the character changing of the chatbot.

In the above, description has been made on the conversation processing based on the constructed regular corpus database 105 and the constructed character corpus database 106. In the following, description would be made on the generating of the character corpus database 106.

The response messages of a chatbot have a strong long-tail effect according to the statistic research results. In a regular corpus database of a chatbot, some of the corpuses may be used frequently. However, these corpuses may be only a small part of the whole corpus database. According to such statistic result, characterized corpus may be prepared in advance only based on these frequently-used corpuses when building the character corpus database. A chatbot may exhibit the characterized style of conversation only by changing the frequently-used corpuses to character corpuses with characterized features.

Figure 3:
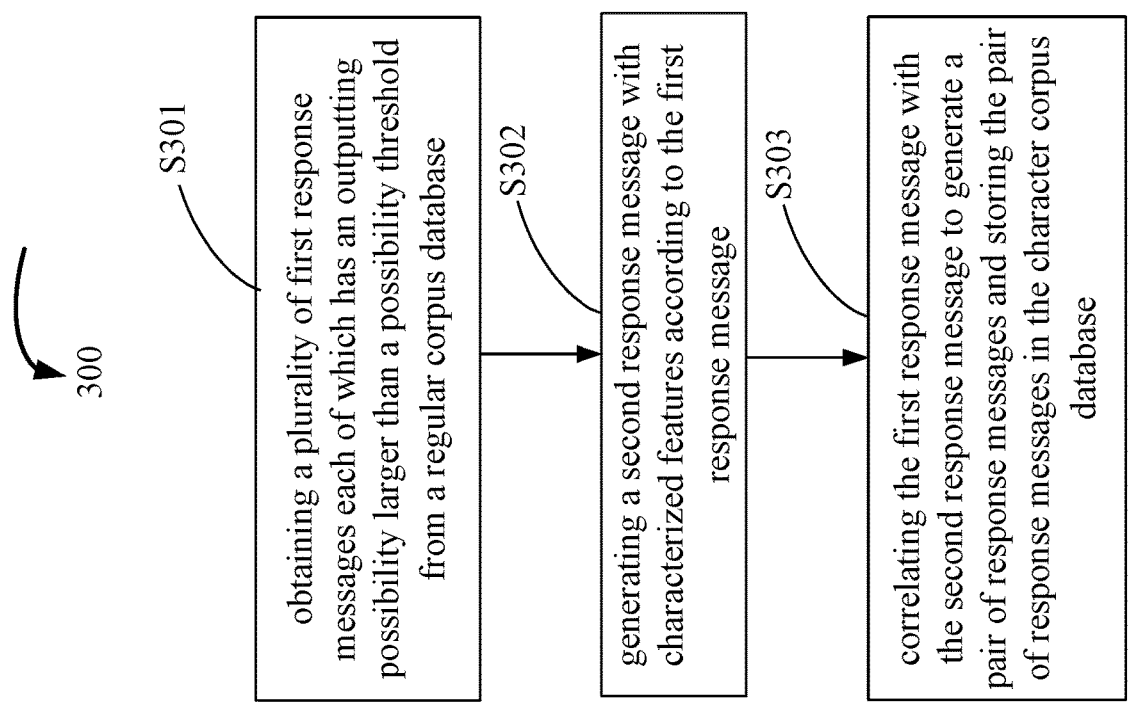
FIG. 3 is a schematic flowchart showing another conversation processing method of embodiments of the present disclosure.

As shown in FIG. 3, which is a schematic flowchart 300 showing another conversation processing method of embodiments of the present disclosure, the conversation processing method may include the following steps.

S301, obtaining a plurality of a first response messages each of which has an outputting possibility larger than a possibility threshold from a regular corpus database. The possibility threshold cited herein may be set flexibly according to a statistic result on the response messages. Such possibility threshold may determine the amount of the first response messages necessary to be subject to the character changing. In view of the factor of efficiency, the frequently-used response messages may be selected for the processing of characterized features. Cost of time spent on constructing the characterized corpus database may be saved a lot by using the frequently-used response messages for the conversion of the characterized corpus.

S302, generating a second response message with characterized features according to the first response message. The specific way for incorporating the characterized features may be as follows: a conceptual content of a character may be incorporated into the first response message to generate the second response message. The conceptual content of a character as cited herein may refer to, for example, the context of the speaking of a character or a concept unique to the character, or a catch phrase of a character. For example, the first response message described above may be "I don't know". When the character is set to a servant girl of ancient time, the generated second response message may be "My liege, your servant doesn't know". More particularly, the phrase of "liege" and "your servant" may be the context of the speaking of the character. As another example in which the first response message described above may be "I don't know", when the character is set to a soldier of Kingdom Shu in the time of Three Kingdoms, the generated second response message may be "this question is so hard that I believe that even Sir Zhuge does not know the answer". More particularly, the phrase of "Sir Zhuge" may be a concept unique to the soldier of Kingdom Shu in the time of Three Kingdoms, and only this character would know the character of "Sir Zhuge". As still another example in which the first response message described above may be "I don't know", when the character is set to a monk of ancient time, the generated second response message may be "Arnita Buddaha, I don't know". More particularly, the phrase of "Arnita Buddaha" may be a catch phrase of a monk.

S303, correlating the first response message with the second response message to generate a pair of response messages and storing the pair of response messages in the character corpus database.

With the processing described above, a character corpus database storing characterized features therein may be generated. The embodiments of the present disclosure may exhibit characterized features by incorporating a conceptual content of a character into a content. Compared with the technical solution of simply changing a tone, talking manner, or the like in the aspect of voice, the embodiments of the present disclosure may make the characterized features stand out so that the user may have a deeper impression of talking with some character.

Figure 4:
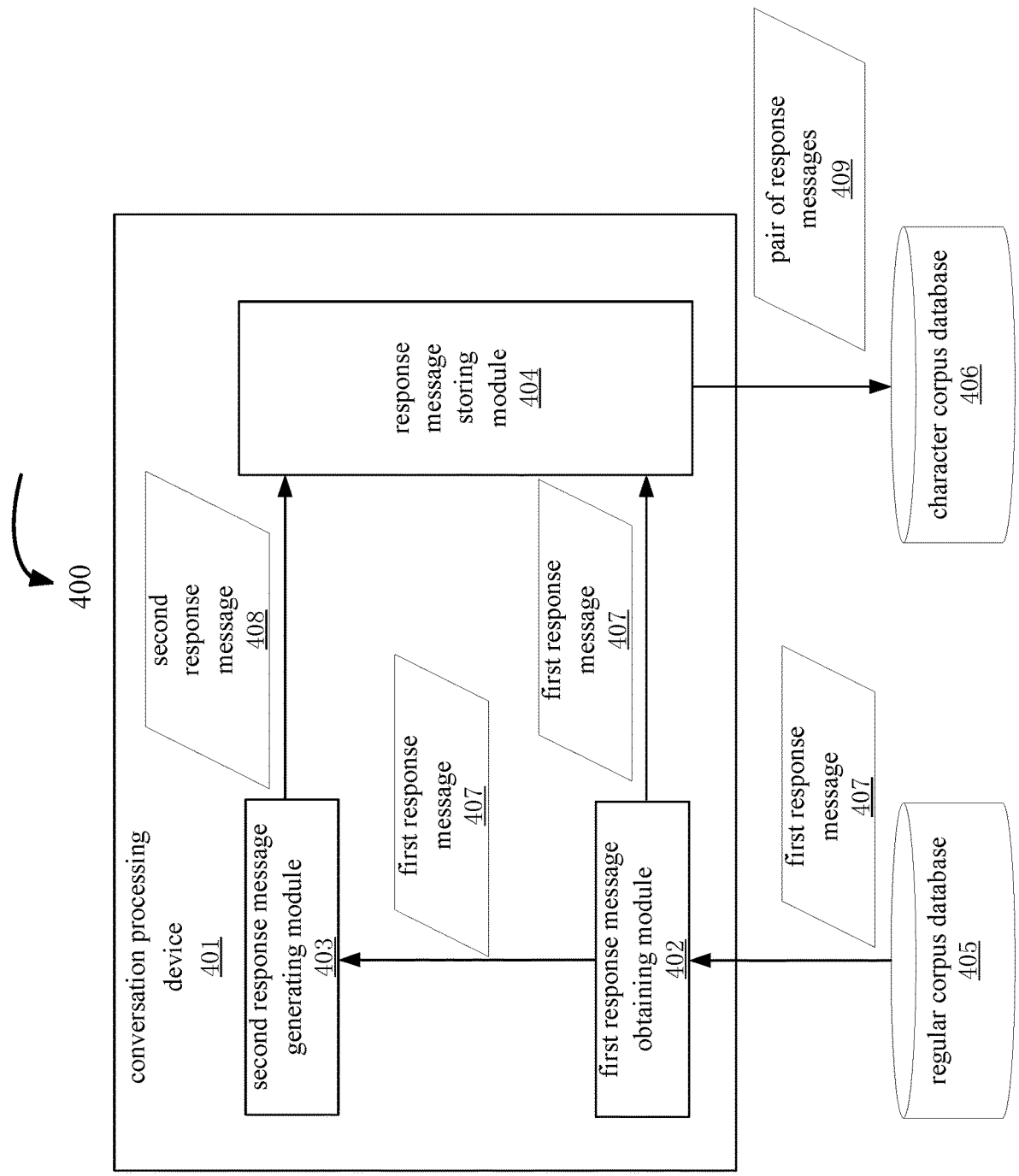
FIG. 4 is an exemplary block diagram of another conversation processing device of embodiments of the present disclosure.

As shown in FIG. 4, which is an exemplary block diagram 400 of another conversation processing device of embodiments of the present disclosure, the processing of generating the character corpus database described above may be performed by a conversation processing device 401. The conversation processing device 401 may include a first response message obtaining module 401, a second response message generating module 403, and a response message storing module 404.

The first response message obtaining module 402 may be configured to obtain a plurality of first response messages 407 whose outputting possibilities are higher than a possibility threshold from a regular corpus database 405.

The second response message generating module 403 may be configured to generate a second response message 408 with characterized features according to the first response message 407.

The response message storing module 404 may be configured to correlating the first response message 407 with the second response message 408 to generate a pair of response messages 409 and store the pair of response messages 409 in the character corpus database 406.

The conversation processing method shown in FIG. 3 may be combined in the conversation processing method shown in FIG. 2 as the pre-processing steps of the conversation processing method shown in FIG. 2. The conversation processing device as shown in FIG. 4 may be also combined into the conversation processing device shown in FIG. 1.

Description has been made on the technical solutions implementing a chatbot with characterized conversation style in the above. In the following, description would be made on the technical solution implementing a chatbot with a conversation style of a personality.

Figure 5:
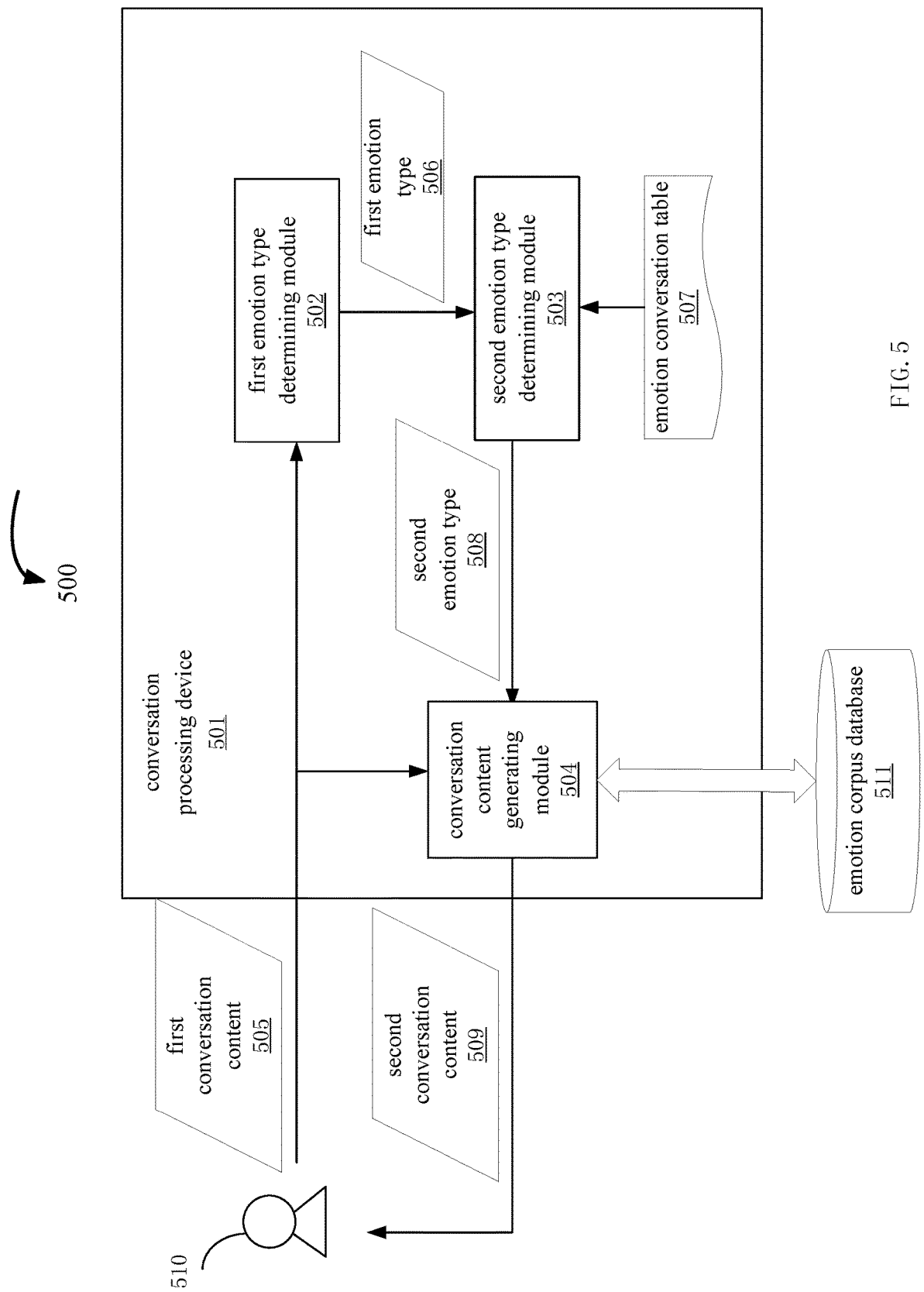
FIG. 5 is an exemplary block diagram of still another conversation processing device of embodiments of the present disclosure.

As shown in FIG. 5, which is an exemplary block diagram 500 of still another conversation processing device of embodiments of the present disclosure, the conversation processing device 501 may be implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The conversation processing device 501 may be also implemented or provided in a personal computer including configurations of laptop computer and non-laptop computer. Furthermore, the conversation processing device 501 may be further implemented as a server on internet or provided in a server on internet. Such server may be implemented in one or more computer systems (distributed server), or implemented as a server based on cloud technology. Such server may be connected with a user's terminal via internet, receive voice output of the user collected by the user's terminal and generate a response message after a conversation processing so as to return the generated response message to the user's terminal as output to the user. The conversation processing device 501 of embodiments of the present disclosure may implement the functions of a chatbot as described above.

The conversation processing device 501 shown in FIG. 5 may include a first emotion type determining module 502, a second emotion type determining module 503, and a conversation content generating module 504.

The first emotion type determining module 502 may be configured to obtain a first conversation content 505 input by a user 510 and determine a first emotion type 506 of the first conversation content 505. The method for determining the emotion type of the first conversation content 505 according thereto may adopt the existing machine learning models for processing. The exemplary emotion types may include, e.g., happy, surprising, neutral, angry, sad, disgusting, or the like.

The second emotion type determining module 503 may be configured to determine a second emotion type 508 according to the first emotion type 506 and an emotion conversation table 507 corresponding to preset personalities.

In the emotion conversation table, correspondence between an emotion of conversation input by one party and an emotion of conversation replied by the other party of the two parties in the conversation. Such correspondence may show features of some specific personality. A second emotion type of a message replied with some personality may be obtained by performing search in the emotion conversation table corresponding to specific personality.

An exemplary emotion conversation table may be as follows.

Emotion conversation table (1)

| First emotion type | Second emotion type |
| --- | --- |
| Emotion type 1 | Emotion type 3 |
| Emotion type 2 | Emotion type 5 |
| Emotion type 3 | Emotion type 1 |
| Emotion type 4 | Emotion type 4 |
| Emotion type 5 | Emotion type 2 |

In the above emotion conversation table (1), emotion types 1 to 5 may be the specific emotions such as happy, surprising, neutral, angry, sad, disgusting. The correspondence between the first emotion type and the second emotion type may be different to different personalities. For example, if a person has an extremely pessimistic personality, the emotion type of the response messages sent by him/her would generally be an emotion type of sadness when hearing a first conversation content of an emotion type of happiness. On the contrary, if a person has an extremely optimistic personality, the emotion type of the response messages sent by him/her would generally be an emotion type of happiness when hearing a first conversation content of an emotion type of sadness.

The conversation content generating module 504 may be configured to generate a second conversation content 509 which is of a second emotion type 508 and could be used as a response message according to a first conversation content 505 and a second emotion type 508 and output the second conversation content 509 to a user 510.

More particularly, in the embodiments of the present disclosure, the corpus database where the response messages could be retrieved may set corresponding emotion type label for each corpus. The conversation content generating module 504 may retrieve a response message with a second emotion type 508 from the emotion corpus database 511 provided with emotion type labels as a second conversation content 509.

The emotion conversation table (1) described above may show a mapping relationship between emotion type and extreme personalities. In most conversation between human beings, the emotion type of response messages replied by human beings with various personalities may have some uncertainty and variability and it may be difficult to see a person's personality from several sentences in the conversation, which may need a relative long conversation with more sentences. In a relative long conversation, there may be possibility in various emotion types of response messages replied by persons with different personalities. For example, if a person has a pessimistic personality, there is a possibility of 60% for the response messages against the first conversation content with a emotion type of happiness to show an emotion type of sadness, and a possibility of 20% to show a disgusting emotion type, and a possibility of 20% to show a neutral emotion type. Such distribution of possibilities for different emotion type may show the personality's features of a character more accurately.

Based on the analysis above, another exemplary emotion conversation table may be as follows.
Emotion Conversation Table (2)

|  | Emotion type 1 | Emotion type 2 | ... | Emotion type n |
|---|---|---|---|---|
| Emotion type 1 | Outputting possibility 11 | Outputting possibility 21 | ... | Outputting possibility n1 |
| Emotion type 2 | Outputting possibility 12 | Outputting possibility 22 | ... | Outputting possibility n2 |
| ... | ... | ... | ... | ... |
| Emotion type n | Outputting possibility 1n | Outputting possibility 2n | ... | Outputting possibility nn |

In the above emotion conversation table (2), the emotion types 1 to n in the first column may represent the first emotion type of the first conversation content input by a user, the emotion types 1 to n in the first row may represent a second emotion type of response messages replied against the first conversation content input by the user. The outputting possibility 11 to the outputting possibility nn in each cell of the table may represent the outputting possibility upon the first emotion type and the second emotion type are combined. In the emotion conversation tables corresponding to different personalities, the outputting possibilities upon the first emotion type and the second emotion type are combined are different.

During conversation, when the first emotion type of a first conversation content input by a user is determined, the outputting possibility of each second emotion type may be in the row corresponding to the determined first emotion type in the emotion conversation table (2) described above.

The usage of the emotion conversation table (2) may be as follows.

The second emotion type determining module 503 may determine a plurality of second emotion types 508 and the outputting possibilities of the second emotion types 508 according to the first emotion type 506 and the emotion conversation table 507.

The conversation content generating module 504 may generate a plurality of second conversation content 509 with a plurality of second emotion types 508 respectively according to the first conversation content 505 and a plurality of second emotion type 508, and select one or more second conversation content 509 as output from the plurality of second conversation content 509 according to the plurality of second emotion types 509.

Figure 6:
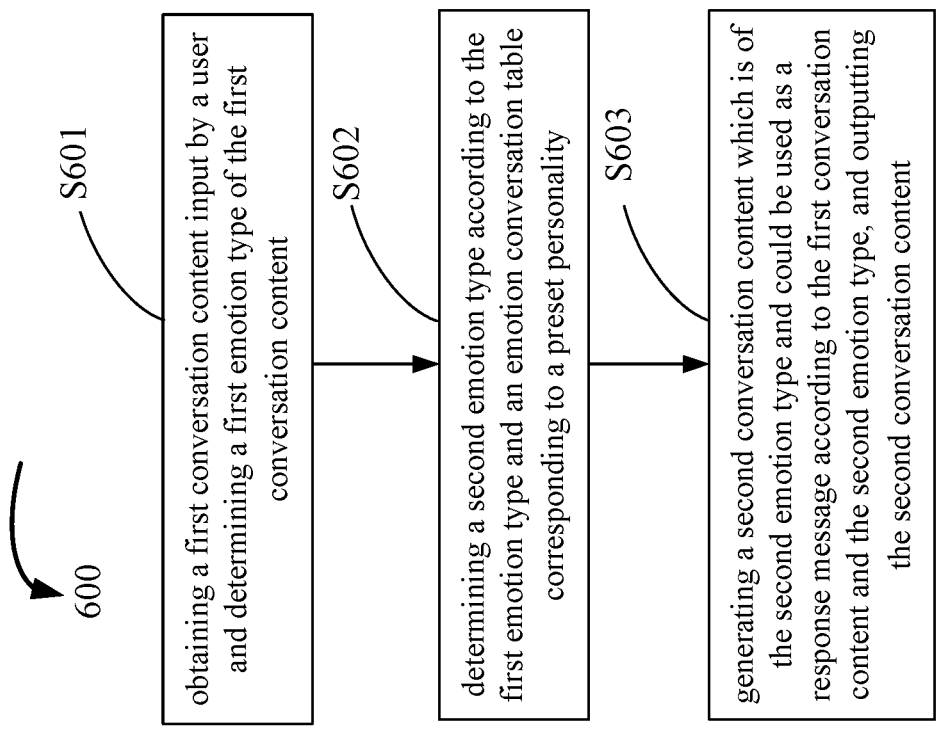
FIG. 6 is a schematic flowchart showing still another conversation processing method of embodiments of the present disclosure.

As shown in FIG. 6, which is a schematic flowchart 600 showing still another conversation processing method of embodiments of the present disclosure, the conversation processing method may be implemented based on the above emotion conversation table (1) and include the following steps.

S601, obtaining a first conversation content input by a user and determining a first emotion type of the first conversation content. This step may be performed by the first emotion type determining module 502.

S602, determining a second emotion type according to the first emotion type and an emotion conversation table corresponding to a preset personality. This step may be performed by a second emotion type determining module 503.

S603, generating a second conversation content which is of the second emotion type and could be used as a response message according to the first conversation content and the second emotion type, and outputting the second conversation content. This step may be performed by the conversation content generating module 504.

Figure 7:
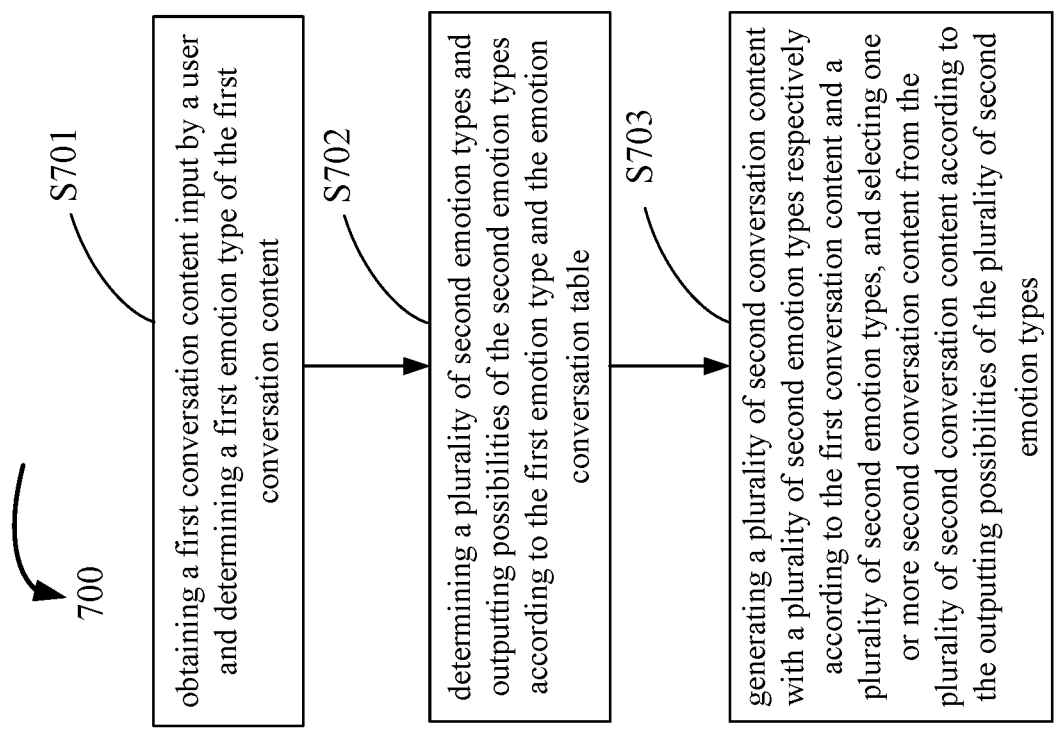
FIG. 7 is a schematic flowchart showing still another conversation processing method of embodiments of the present disclosure.

As shown in FIG. 7, which is a schematic flowchart 700 showing still another conversation processing method of embodiments of the present disclosure, the conversation processing method may be implemented based on the emotion conversation table (2) as described above and include the following steps.

S701, obtaining a first conversation content input by a user and determining a first emotion type of the first conversation content. This step may be performed by the first emotion type determining module 502.

S702, determining a plurality of second emotion types and outputting possibilities of the second emotion types according to the first emotion type and the emotion conversation table. This step may be performed by the second emotion type determining module 503.

S703, generating a plurality of second conversation content with a plurality of second emotion types respectively according to the first conversation content and a plurality of second emotion types, and selecting one or more second conversation content from the plurality of second conversation content according to the outputting possibilities of the plurality of second emotion types. This step may be performed by the conversation content generating module 504.

The conversation processing method and device based on emotion conversation table of embodiments of the present disclosure may control a chatbot by using an emotion conversation table representing different personality type during conversation processing and select an emotion type of the outputting conversation suitable for a set personality, so as to stimulate the features of personality in the view of emotion features of conversation. Furthermore, the outputting possibilities of combinations of various of emotion types are used in the emotion conversation table so that an emotion type distribution showing features of personality may be realized during a long conversation, and thus a user may have an impression on the features of personality of a chatbot during a long conversation and have a feeling closer to the feeling of conversation between human beings.

Exemplary Implementations

A category system of Big Five may be adopted for classifying personalities in embodiments of the present disclosure. The expression of "Big Five" may refer to five factors in the personality structure. Such classification system may focus on the universality of each dimension of personality model. These five factors in dimensions may be openness to experience, conscientiousness, extraversion, agreeableness, and neuroticism.

In embodiments of the present disclosure, to form distinctive personality features, each factor may be subjected to a processing of dichotomies so as to generate five groups of opposite personalities and emotion conversation table corresponding thereto. The personality system of embodiments of the present disclosure may include the following 10 personalities.

neuroticism and non-neuroticism;
extraversion and introversion;
openness to experience and non-openness to experience;
agreeableness and non-agreeableness; and
conscientiousness and non-conscientiousness.

In the following, examples of emotion conversation table (3) corresponding to introversion and emotion conversation table (4) corresponding to extraversion. Similarly with the emotion conversation table (2), the first column may be the first emotion types corresponding to the first conversation content input by a user, and the first row may be second emotion types of response messages replied against the first conversation content input by the user.

Emotion Conversation Table (3)—Introvertive Personality

|  | Happy | Surprising | Neutral | Angry | Sad | Disgusting |
| --- | --- | --- | --- | --- | --- | --- |
| Happy | 0.11 | 0.067 | 0.66 | 0 | 0.067 | 0.096 |
| Surprising | 0.057 | 0.1 | 0.73 | 0.014 | 0.043 | 0.057 |
| Neutral | 0.068 | 0.03 | 0.73 | 0.014 | 0.056 | 0.096 |
| Angry | 0 | 0.056 | 0.56 | 0.14 | 0.11 | 0.14 |
| Sad | 0.051 | 0.041 | 0.64 | 0.02 | 0.14 | 0.1 |
| Disgusting | 0.086 | 0.031 | 0.55 | 0.055 | 0.078 | 0.2 |

Emotion Conversation Table (4)—Extravertive Personality

|  | Happy | Surprising | Neutral | Angry | Sad | Disgusting |
| --- | --- | --- | --- | --- | --- | --- |
| Happy | 0.16 | 0.044 | 0.6 | 0.024 | 0.063 | 0.11 |
| Surprising | 0.088 | 0.073 | 0.63 | 0.023 | 0.069 | 0.12 |
| Neutral | 0.082 | 0.043 | 0.71 | 0.02 | 0.054 | 0.089 |
| Angry | 0.1 | 0.053 | 0.51 | 0.095 | 0.06 | 0.19 |
| Sad | 0.088 | 0.044 | 0.6 | 0.028 | 0.13 | 0.12 |
| Disgusting | 0.095 | 0.047 | 0.53 | 0.051 | 0.066 | 0.21 |

In practical implementations, to better distinguish various types of personalities, the differences between combinations of emotion types of opposite personalities may be amplified. For example, in the above emotion conversation table (3) and emotion conversation table (4), when the first emotion type is happy, the possibilities for the second emotion types of introvertive personality and extravertive personality may be 0.11 and 0.16, respectively. However, in implementation, these two values may be adjusted to 0.055 and 0.32. Accordingly, other values in that row may be adaptively adjusted so that the sum of possibilities in each row may still be 1.

Specific Embodiments

In some examples, one or more components or modules and one or more steps as shown in FIG. 1 to FIG. 14 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 8:
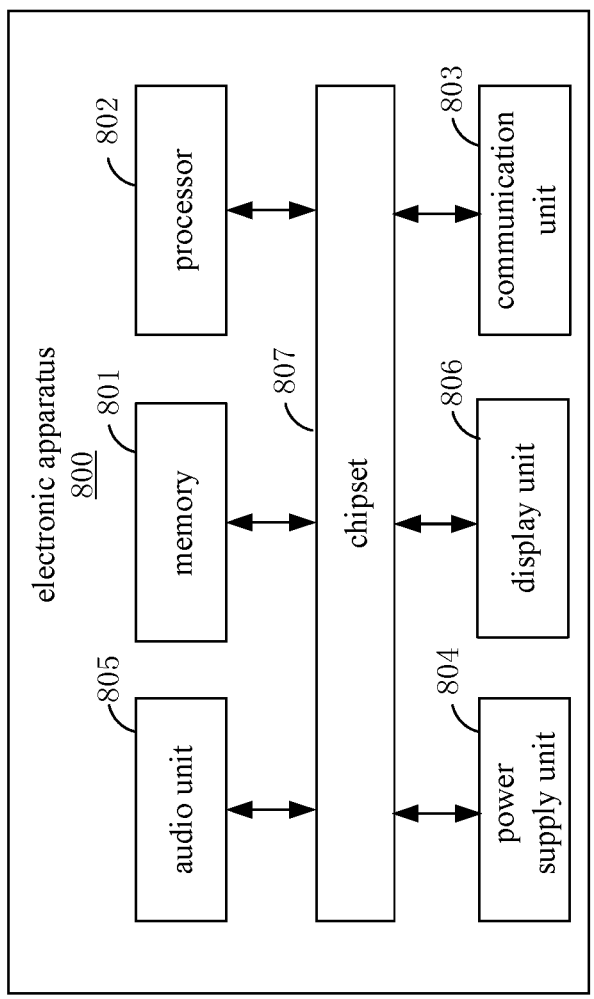
FIG. 8 is a schematic structural block diagram of an electronic apparatus of embodiments of the present disclosure.

As shown in FIG. 8, which is a schematic structural block diagram of an electronic apparatus 800 of embodiments of the present disclosure, the electronic apparatus 800 may include: a memory 801 and a processor 802.

The memory 801 may be configured to store programs. In addition to the above programs, the memory 801 may be configured to store other data to support operations on the electronic apparatus 800. The examples of these data may include instructions of any applications or methods operated on the electronic apparatus 800, contact data, phone book data, messages, pictures, videos, and the like.

The memory 801 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

In some examples, the memory 801 may be coupled to the processor 802 and contain instructions stored thereon. The instructions may cause the electronic apparatus 800 to perform operations upon being executed by the processor 802, the operations may include:

obtaining a first conversation content input by a user, and generating a second conversation content as a response message according to the first conversation content;

retrieving a third conversation content matched with the second conversation content according to the second conversation content in the character corpus database;

outputting the second conversation content or the third conversation content according to a conversation output controlling rule, if the third conversation content is found.

More particularly, the outing the second conversation content or the third conversation content according to a conversation output controlling rule may include the following steps.

selecting the second conversation content or the third conversation content as output according to the characterized response possibility and the regular response possibility.

More particularly, there are a plurality of pairs of response messages configured in the character corpus database, and each pair of response messages may include a first response message and a second response message. The first response message may be a regular response message, and the second response message may be a characterized response message corresponding to the regular response message.

The retrieving a third conversation content matched with the second conversation content according to the second conversation content in the character corpus database may include:

retrieving one or more first response messages whose similarity with the second conversation content meet a similarity threshold in the character corpus database and obtaining the second response message corresponding to the first response message as the third conversation content.

As embodiments of another electronic apparatus, the above operations may include:

obtaining a plurality of first response messages whose outputting possibilities are higher than a possibility threshold from a regular corpus database;

generating a second response message with characterized features according to the first response message;

correlating the first response message and the second response message to generate a pair of response messages and storing the pair of response messages in a character corpus database.

More particularly, the generating a second response message with characterized features according to the first response message may include:

incorporating a conceptual content of a character into a first response message to generate a second response message.

As embodiments of another electronic apparatus, the above operations may include:

obtaining a first conversation content input by a user, and determining a first emotion type of the first conversation content;

determining a second emotion type according to a first emotion type and an emotion conversation table corresponding to a preset personality;

generating a second conversation content which is of a second emotion type and could be used as response message according to first conversation content and a second emotion type, and outputting the second conversation content.

More particularly, in the emotion conversation table, each first emotion type may correspond to a plurality of second emotion types, and outputting possibility of each second emotion type corresponding to each first emotion type may be recorded in the emotion conversation table.

More particularly, the determining a second emotion type according to a first emotion type and an emotion conversation table corresponding to a preset personality may include:

determining a plurality of second emotion types and outputting possibility of each second emotion type according to the first emotion type and the emotion conversation table.

More particularly, the generating a second conversation content which is of a second emotion type and could be used as response message according to first conversation content and a second emotion type, and outputting the second conversation content may include:

generating a plurality of second conversation content which are of a plurality of second emotion types according to the first conversation content and a plurality of second emotion types, and selecting one or more second conversation content from a plurality of second conversation content as output according to the outputting possibilities of the plurality of second emotion types.

More particularly, the generating a second conversation content which is of a second emotion type according to the first conversation content and the second emotion type may include:

performing searching in the emotion corpus database with emotion type labels according to the first conversation content and the second emotion type to generate a second conversation content.

Detailed description has been made on the above operations in the above embodiments of method and device. The description on the above operations may be applied to electronic apparatus 800. That is to say, the specific operations mentioned in the above embodiments may be recorded in memory 801 in program and be performed by processor 802.

Furthermore, as shown in FIG. 8, the electronic apparatus 800 may further include: a communication unit 803, a power supply unit 804, an audio unit 805, a display unit 806, chipset 807, and other units. Only part of units are exemplarily shown in FIG. 8 and it is obvious to one skilled in the art that the electronic apparatus 800 only includes the units shown in FIG. 8.

The communication unit 803 may be configured to facilitate wireless or wired communication between the electronic apparatus 800 and other apparatuses. The electronic apparatus may be connected to wireless network based on communication standard, such as WiFi, 2G, 3G, or their combination. In an exemplary example, the communication unit 803 may receive radio signal or radio related information from external radio management system via radio channel. In an exemplary example, the communication unit 803 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 804 may be configured to supply power to various units of the electronic device. The power supply unit 804 may include a power supply management system, one or more power supplies, and other units related to power generation, management, and allocation.

The audio unit 805 may be configured to output and/or input audio signals. For example, the audio unit 805 may include a microphone (MIC). When the electronic apparatus in an operation mode, such as calling mode, recording mode, and voice recognition mode, the MIC may be configured to receive external audio signals. The received audio signals may be further stored in the memory 801 or sent via the communication unit 803. In some examples, the audio unit 805 may further include a speaker configured to output audio signals.

The display unit 806 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 801, processor 802, communication unit 803, power supply unit 804, audio unit 805 and display unit 806 may be connected with the chipset 807. The chipset 807 may provide interface between the processor 802 and other units of the electronic apparatus 800. Furthermore, the chipset 807 may provide interface for each unit of the electronic apparatus 800 to access the memory 801 and communication interface for accessing among units.

Example Clauses

A. A method, including:

obtaining a first conversation content input by a user, and generating a second conversation content which can be used as a response message according to the first conversation content;

searching for a third conversation content matched with the second conversation content in a character corpus database according to the second conversation content; and outputting the second conversation content or the third conversation content according to a conversation output controlling rule, if the third conversation content is found.

B. The method according to paragraph A, wherein the outputting the second conversation content or the third conversation content according to a conversation output controlling rule, if the third conversation content is found includes:

selecting the second conversation content or the third conversation content as output according to a characterized response possibility and a regular response possibility.

C. The method according to paragraph A, wherein a plurality of pairs of response messages are provided in the character corpus database, each pair of response messages includes a first response message and a second response message, the first response message is a regular response message, and the second response message is a characterized response message corresponding to the regular response message;

the searching for a third conversation content matched with the second conversation content in a character corpus database according to the second conversation content includes:

searching for one or more first response messages each of which has a similarity with the second conversation content meeting a similarity threshold, and obtaining a second response message corresponding to the first response message as the third conversation content.

D. A method, including:

obtaining a plurality of first response messages, each of which has an outputting possibility higher than a possibility threshold, from a regular corpus database;

generating a second response message with characterized features according to the first response message; and correlating the first response message and the second response message to generate a pair of response messages and storing the pair of response messages in the character corpus database.

E. The method according to paragraph D, wherein the generating a second response message with characterized features according to the first response message includes:

incorporating a conceptual content of a character into a first response message to generate the second response message.

F. A method including:

obtaining a first conversation content input by a user and determining a first emotion type of the first conversation content;

determining a second emotion type according to the first emotion type and an emotion conversation table corresponding to a preset personality; and generating a second conversation content which is of the second emotion type and can be used as a response message according to the first conversation content and the second emotion type, and outputting the second conversation content.

G. The method according to paragraph F, wherein in the emotion conversation table, each of the first emotion types corresponds to a plurality of second emotion types, and an outputting possibility of each second emotion type corresponding to each of the first emotion types is recorded in the emotion conversation table, the determining a second emotion type according to the first emotion type and an emotion conversation table corresponding to a preset personality includes: determining a plurality of second emotion types and outputting possibility of each second emotion type according to the first emotion type and the emotion conversation table, the generating a second conversation content which is of the second emotion type and can be used as a response message according to the first conversation content and the second emotion type, and outputting the second conversation content includes:

generating a plurality of second conversation content each of which is of the second emotion type according to the first conversation content and the plurality of second emotion types, and selecting one or more second conversation content as output from the plurality of second conversation content according to the outputting possibilities of the plurality of second emotion types.

H. The method according to paragraph F, wherein the generating a second conversation content which is of the second emotion type and can be used as a response message according to the first conversation content and the second emotion type includes:

performing searching in an emotion corpus database with emotion type labels according to the first conversation content and the second emotion type and generating the second conversation content.

I. A device including:

a regular conversation generating module, configured to obtain a first conversation content input by a user, and generating a second conversation content which can be used as a response message according to the first conversation content;

a characterized conversation generating module, configured to search for a third conversation content matched with the second conversation content in a character corpus database according to the second conversation content; and an output controlling module, configured to output the second conversation content or the third conversation content according to a conversation output controlling rule, if the third conversation content is found.

J. The device according to paragraph I, wherein the outputting the second conversation content or the third conversation content according to a conversation output controlling rule, if the third conversation content is found includes:

selecting the second conversation content or the third conversation content as output according to a characterized response possibility and a regular response possibility.

K. The device according to paragraph I, wherein a plurality of pairs of response messages are provided in the character corpus database, each pair of response messages includes a first response message and a second response message, the first response message is a regular response message, and the second response message is a characterized response message corresponding to the regular response message;

the searching for a third conversation content matched with the second conversation content in a character corpus database according to the second conversation content includes:

searching for one or more the first response messages each of which has a similarity with the second conversation content meeting a similarity threshold, and obtaining a second response message corresponding to the first response message as the third conversation content.

L. A device, including:

a first response message obtaining module, configured to obtain a plurality of first response messages, each of which has an outputting possibility higher than a possibility threshold, from a regular corpus database;

a second response message generating module, configured to generate a second response message with characterized features according to the first response message; and a response message storing module, configured to correlate the first response message and the second response message to generate a pair of response messages and store the pair of response messages in the character corpus database.

M. The device according to paragraph L, wherein the generating a second response message with characterized features according to the first response message includes:

incorporating a conceptual content of a character into a first response message to generate the second response message.

N. A device including:

a first emotion type determining module, configured to obtain a first conversation content input by a user and determine a first emotion type of the first conversation content;

a second emotion type determining module, configured to determine a second emotion type according to the first emotion type and an emotion conversation table corresponding to a preset personality; and a conversation content generating module, configured to generate a second conversation content which is of the second emotion type and can be used as a response message according to the first conversation content and the second emotion type, and output the second conversation content.

O. The device according to paragraph N, wherein in the emotion conversation table, each of the first emotion types corresponds to a plurality of second emotion type, and outputting possibility of each second emotion type corresponding to each of the first emotion types is recorded in the emotion conversation table, the determining a second emotion type according to the first emotion type and an emotion conversation table corresponding to a preset personality includes: determining a plurality of second emotion types and outputting possibility of each second emotion type according to the first emotion type and the emotion conversation table, the generating a second conversation content which is of the second emotion type and can be used as a response message according to the first conversation content and the second emotion type, and outputting the second conversation content includes:

generating a plurality of second conversation content each of which is of the second emotion type according to the first conversation content and the plurality of second emotion types, and selecting one or more second conversation content as output from the plurality of second conversation content according to the outputting possibilities of the plurality of second emotion types.

P. The device according to paragraph N, wherein the generating a second conversation content which is of the second emotion type and can be used as a response message according to the first conversation content and the second emotion type includes:

performing searching in an emotion corpus database with emotion type labels according to the first conversation content and the second emotion type and generating the second conversation content.

Q. An electronic apparatus, including:

a processing unit; and a memory, coupled to the processing unit and containing instructions stored thereon, the instructions cause the electronic apparatus to perform operations upon being executed by the processing unit, the operations include:

obtaining a first conversation content input by a user, and generating a second conversation content which can be used as a response message according to the first conversation content;

searching for a third conversation content matched with the second conversation content in a character corpus database according to the second conversation content; and outputting the second conversation content or the third conversation content according to a conversation output controlling rule, if the third conversation content is found.

R. The electronic apparatus according to paragraph Q, wherein the outputting the second conversation content or the third conversation content according to a conversation output controlling rule, if the third conversation content is found includes:

selecting the second conversation content or the third conversation content as output according to a characterized response possibility and a regular response possibility.

S. The electronic apparatus according to paragraph Q, wherein a plurality of pairs of response messages are provided in the character corpus database, each pair of response messages includes a first response message and a second response message, the first response message is a regular response message, and the second response message is a characterized response message corresponding to the regular response message;

the searching for a third conversation content matched with the second conversation content in a character corpus database according to the second conversation content includes:

searching for one or more first response messages each of which has a similarity with the second conversation content meeting a similarity threshold, and obtaining a second response message corresponding to the first response message as the third conversation content.

T. An electronic apparatus, including:

a processing unit; and a memory, coupled to the processing unit and containing instructions stored thereon, the instructions cause the electronic apparatus to perform operations upon being executed by the processing unit, the operations include:

obtaining a plurality of first response messages, each of which has an outputting possibility higher than a possibility threshold, from a regular corpus database;

generating a second response message with characterized features according to the first response message; and correlating the first response message and the second response message to generate a pair of response messages and storing the pair of response messages in the character corpus database.

U. The electronic apparatus according to paragraph T, wherein the generating a second response message with characterized features according to the first response message includes:

incorporating a conceptual content of a character into a first response message to generate the second response message.

V. An electronic apparatus including:

a processing unit; and a memory, coupled to the processing unit and containing instructions stored thereon, the instructions cause the electronic apparatus to perform operations upon being executed by the processing unit, the operations include:

obtaining a first conversation content input by a user and determining a first emotion type of the first conversation content;

determining a second emotion type according to the first emotion type and an emotion conversation table corresponding to a preset personality; and generating a second conversation content which is of the second emotion type and can be used as a response message according to the first conversation content and the second emotion type, and outputting the second conversation content.

W. The electronic apparatus according to paragraph V, wherein in the emotion conversation table, each of the first emotion types corresponds to a plurality of second emotion type, and an outputting possibility of each second emotion type corresponding to each of the first emotion types is recorded in the emotion conversation table, the determining a second emotion type according to the first emotion type and an emotion conversation table corresponding to a preset personality includes: determining a plurality of second emotion types and an outputting possibility of each second emotion type according to the first emotion type and the emotion conversation table, the generating a second conversation content which is of the second emotion type and can be used as a response message according to the first conversation content and the second emotion type, and outputting the second conversation content includes:

generating a plurality of second conversation content each of which is of the second emotion type according to the first conversation content and the plurality of second emotion types, and selecting one or more second conversation content as output from the plurality of second conversation content according to the outputting possibilities of the plurality of second emotion types.

X. The electronic apparatus according to paragraph V, wherein the generating a second conversation content which is of the second emotion type and can be used as a response message according to the first conversation content and the second emotion type includes:

performing searching in an emotion corpus database with emotion type labels according to the first conversation content and the second emotion type and generating the second conversation content.

CONCLUSION

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A device, comprising:
   at least one processor; and
   memory including instruction that, when executed the at least one processor, cause the at least one processor to perform operations to:
   obtain a subset of a response corpus of standard response messages based on frequency of retrieval of standard response messages in the response corpus;
   generate a character corpus database including characterized responses generated by applying characterized features to standard responses included in the subset of the response corpus, wherein a plurality of pairs of response messages are provided in the character corpus database, wherein each pair of response messages comprises a first response message and a second response message, and wherein the first response message is a regular response message, and the second response message is a characterized response message corresponding to the regular response message;
   obtain a first conversation content input by a user, and generate a second conversation content which can be used as a response message according to the first conversation content using the response corpus of standard response messages;
   search the character corpus database for a third conversation content matched with the second conversation content in the character corpus database according to the second conversation content, wherein the third conversation content is located by searching for one or more first response messages each of which has a similarity with the second conversation content meeting a similarity threshold, and obtaining a second response message corresponding to the first response message as the third conversation content; and
   output the second conversation content or the third conversation content according to a conversation output controlling rule.

2. The device according to claim 1, wherein the instructions to output the second conversation content or the third conversation content according to a conversation output controlling rule, comprises instructions to:
   select the second conversation content or the third conversation content as output according to a characterized response possibility and a regular response possibility.

3. An electronic apparatus, comprising:
   a processing unit; and
   a memory, coupled to the processing unit and containing instructions stored thereon, the instructions cause the electronic apparatus to perform operations upon being executed by the processing unit, the operations comprise:
   obtaining a subset of a response corpus of standard response messages based on frequency of retrieval of standard response messages in the response corpus;
   generating a character corpus database including characterized responses generated by applying characterized features to standard responses included in the subset of the response corpus, wherein a plurality of pairs of response messages are provided in the character corpus database, wherein each pair of response messages comprises a first response message and a second response message, and wherein the first response message is a regular response message, and the second response message is a characterized response message corresponding to the regular response message;
   obtaining a first conversation content input by a user, and generating a second conversation content which can be used as a response message according to the first conversation content using the response corpus of standard response messages;
   searching the character corpus database for a third conversation content matched with the second conversation content in the character corpus database according to the second conversation content, wherein the third conversation content is located by searching for one or more first response messages each of which has a similarity with the second conversation content meeting a similarity threshold, and obtaining a second response message corresponding to the first response message as the third conversation content; and
   outputting the second conversation content or the third conversation content according to a conversation output controlling rule.

4. The electronic apparatus according to claim 3, wherein the outputting the second conversation content or the third conversation content according to a conversation output controlling rule, if the third conversation content is found comprises:
   selecting the second conversation content or the third conversation content as output according to a characterized response possibility and a regular response possibility.

* * * * *